UNITED STATES PATENT OFFICE 2,457,640

HYDROXYCARBOXYLIC ACID

Herman A. Bruson, Rydal, and Warren D. Niederhauser, Philadelphia, Pa., assignors, by mesne assignments, to Rohm & Haas Company, Philadelphia, Pa., a corporation of Delaware No Drawing. Application November 9, 1945, Serial No. 627,776

3 Claims. (Cl. 260—407)

This invention concerns the hydroxycarboxylic acid of the formula:

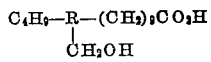

wherein R is a saturated six-sided carbocycle, $C_6H_9$. It further deals with the polyesters which are formed therefrom.

The hydroxyacid is prepared by hydrogenating the unsaturated aldehydo-carboxylic acid obtained as an addition product from acrolein and elaeostearic acid, as described in our abandoned application Serial No. 623,442, filed October 19, 1945. The hydrogenation is carried on under conditions such that the carboxyl group remains. For the saturation of the double bonds in the addition product and reduction of the aldehydo group, a nickel catalyst, such as Raney nickel, is used at temperatures of 70° to 200° C. under pressure, usually pressures of 3 to 100 atmospheres being ample. Similarly, platinum and palladium catalysts may be used at low temperatures with or without pressure. Furthermore, by the use of catalysts such as cobalt, the aldehyde group may be converted to a hydroxyl group without reduction of the double bonds and the unsaturated hydroxycarboxylic acid used directly, as in the preparation of resins, or the double bonds may be saturated in a second step.

The unsaturated product has the formula:

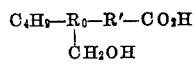

wherein $R_0$ is a six-sided carbocycle with one double bond and $R'$ is a straight-chained aliphatic group containing an olefinic linkage.

For practical purposes, hydrogenation is best carried out with a salt or ester rather than with the free aldehydo-carboxylic acid.

It is disclosed in application Serial No. 623,442 that the unsaturated aldehydo-carboxylic acid is obtained by reacting at about 100° to about 250° C. or even to 300° C. acrolein and elaeostearic acid. The addition is effected in the absence of any polymerizing agent and advantageously in the presence of a polymerization inhibitor, such as β-naphthol, hydroquinone, or the like, and under an inert atmosphere, for example, nitrogen or carbon dioxide.

As a specific example of the reaction of drying oil fatty acid and acrolein, a mixture of 111.2 parts of tung oil fatty acids, 33.5 parts of acrolein, and one part of copper powder was heated in an autoclave under hydrogen. During the course of one hour, the temperature was raised from 25° to 290° C. After the autoclave had been cooled, the product was removed and distilled under reduced pressure to give 62 parts (47% yield) of aldehydoacid as a yellow oil distilling at 220°–240° C. at 3 mm. pressure. A sample taken for analysis boiled at 220°–230° C. at 1 mm. and had an acid number of 173, a refractive index, $n_D^{25}$, of 1.4924, and a density $$d_4^{25}, \text{ of } 0.9783$$

The calculated acid number for $C_{21}H_{34}O_3$ is 168. The product contains both an aldehydo group and an acid group and is unsaturated.

The invention is illustrated by the following examples:

Example 1

Seventeen parts of the aldehydo-carboxylic acid obtained by reacting together one mol of acrolein and one mol of α-elaeostearic acid was carefully titrated with a 3% aqueous potassium hydroxide solution until a phenolphthalein end point was reached. The resulting solution was mixed with five parts of Raney nickel and heated with hydrogen in a rocking autoclave at 100° C. for three hours at 100 atmospheres pressure and then at 180° C. for thirty minutes. The mixture was removed from the autoclave and filtered. The filtrate was rendered acid with separation of hydroxyacid. The crude product was recrystallized from nitroethane. It then melted at 78.5°–79° C. This product was analyzed with the following results: C, 74.15%; H, 11.89%; hydroxyl number, 158. These data agree fairly well with calculated values for $C_{21}H_{40}O_3$, $C_4H_9.R$ $(CH_2OH).(CH_2)_9CO_2H$, carbon, 74.1%; hydrogen, 11.74%; and hydroxyl number, 165.

When this product is heated, it forms a linear polyester by auto-esterification which is useful in lubricating oils and greases.

The formula of the esters of this invention may be written:

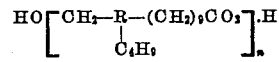

where $n$ is an integer expressing the number of hydroxyacid units entering into the linear polyester. If $n$ is one, the simple hydroxyacid is at hand. If $n$ is more than one, linear polymers are at hand and $n$ may have values of the order of ten to one hundred or more.

Example 2

There was heated six parts of the hydroxyacid prepared above with 0.05 part of zinc chloride at 235° C. under oxygen-free nitrogen for three hours. The heated product was then maintained at 210°–230° C. for six hours at 2 mm. pressure. The resulting product was a thick amber syrup which was soluble in aromatic hydrocarbons and ethylene dichloride and slightly soluble in acetone and ethyl alcohol.

We claim:

1. A compound of the formula:

$$C_4H_9-R-(CH_2)_9COOH$$
$$\overset{|}{CH_2OH}$$

wherein R is a six-sided carbocycle of the formula $C_6H_9$.

2. A linear polymer of the formula $$HO[CH_2-R(C_4H_9)-(CH_2)_9COO]_nH$$

wherein R represents a six-sided carbocycle of the formula $C_6H_9$ and $n$ represents an integer from ten to one hundred.

3. A compound of the formula $$HO[CH_2-R(C_4H_9)-(CH_2)_9COO]_nH$$

wherein $n$ is an integer from one to one hundred, R representing a six-sided carbocycle of the formula $C_6H_9$.

HERMAN A. BRUSON.
WARREN D. NIEDERHAUSER.

REFERENCES CITED

The following references are of record in the file of this patent:

UNITED STATES PATENTS

| Number | Name | Date |
|---|---|---|
| 2,033,131 | Ellis | Mar. 10, 1936 |

OTHER REFERENCES

Groggins: "Unit Processes in Organic Synthesis," 1938 ed.; page 419.

Bailey: "Industrial Oil and Fat Products," 1945 ed.; pages 178–179.